United States Patent
Grimm et al.

(10) Patent No.: US 8,761,997 B2
(45) Date of Patent: Jun. 24, 2014

(54) VEHICLE HEADLAMP CONTROL DEVICE AND METHOD

(75) Inventors: Martin Grimm, Oberursel (DE); Pierre Albou, Paris (FR)

(73) Assignee: Valeo Vision, Bobigny (FR)

( * ) Notice: Subject to any disclaimer, the term of this patent is extended or adjusted under 35 U.S.C. 154(b) by 306 days.

(21) Appl. No.: 13/188,527

(22) Filed: Jul. 22, 2011

(65) Prior Publication Data

US 2012/0022743 A1    Jan. 26, 2012

(30) Foreign Application Priority Data

Jul. 26, 2010   (FR) ...................... 10 56083

(51) Int. Cl.
*G06F 7/00*   (2006.01)
(52) U.S. Cl.
USPC ............ 701/36; 701/33.6; 701/33.8; 702/85; 702/92; 702/97; 702/104; 702/127; 340/636.1; 340/933
(58) Field of Classification Search
USPC .......... 701/33.6, 36, 11, 9, 33.8; 702/104, 85, 702/97, 127, 142; 340/933, 636.1
See application file for complete search history.

(56) References Cited

U.S. PATENT DOCUMENTS

| | | | |
|---|---|---|---|
| 5,627,752 A | 5/1997 | Buck et al. | |
| 8,269,641 B2 * | 9/2012 | Bauman et al. | 340/636.1 |
| 2004/0056778 A1 * | 3/2004 | Hilliard | 340/933 |

FOREIGN PATENT DOCUMENTS

| | | |
|---|---|---|
| DE | 4344369 A1 | 7/1995 |
| DE | 102004021998 A1 | 5/2006 |
| DE | 102005024403 A1 | 1/2007 |

OTHER PUBLICATIONS

On-Board Vision Processing for Small UAVs: Time to Rethink Strategy; Ehsan, S. ; McDonald-Maier, K.D.; Adaptive Hardware and Systems, 2009. AHS 2009. NASA/ESA Conference on; Digital Object Identifier: 10.1109/AHS.2009.6 Publication Year: 2009 , pp. 75-81.*

Electrochemical Capacitor Voltage Supplement for Large-Scale Naval Submarines; Finley, J.E. ; Taylor, D.I. ; Klein, J.M. ; Byrne, C. ; Hochstrasser, N. ; Hess, H.L. ; Johnson, B.K. ; Law, J.D. ; Griffitts, A.R.; Power Symposium, 2007. NAPS '07. 39th North American; Digital Object Id.: 10.1109/NAPS.2007.4402302; Pub. Year: 2007 , pp. 148-152.*

* cited by examiner

*Primary Examiner* — Cuong H Nguyen
(74) *Attorney, Agent, or Firm* — Jacox, Meckstroth & Jenkins

(57) ABSTRACT

A method for controlling at least one component of a motor vehicle provided with energy storage means. The method comprises the steps of determination of an energy reserve value of the vehicle; evaluation of at least one critical energy autonomy threshold; and comparison of the energy reserve value with at least one critical autonomy threshold so as to deduce therefrom a setpoint signal for controlling the component.

25 Claims, 3 Drawing Sheets

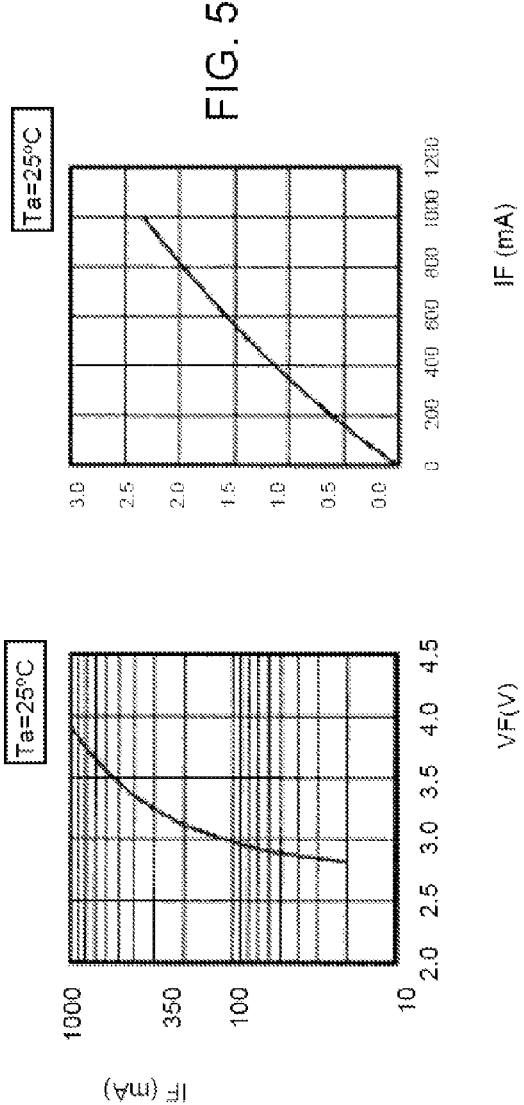
FIG. 5
FIG. 3
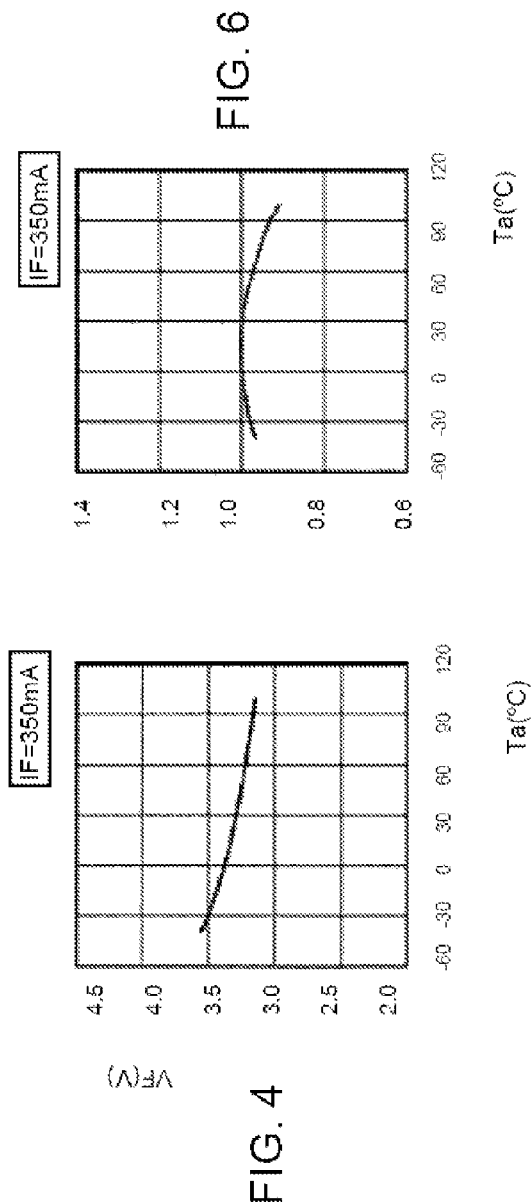
FIG. 6
FIG. 4

VEHICLE HEADLAMP CONTROL DEVICE AND METHOD

CROSS-REFERENCE TO RELATED APPLICATIONS

This application claims priority to French Application No. 1056083 filed Jul. 26, 2010, which application is incorporated herein by reference and made a part hereof.

BACKGROUND OF THE INVENTION

1. Field of the Invention

The present invention relates to a method for controlling at least one component of a vehicle. It also relates to a system having means capable of implementing this method.

2. Description of the Related Art

A preferred application of the invention is in the automotive equipment field with in particular the adaptation of the operation of the vehicle to its traffic situation.

The invention may thus be used to adapt the luminous flux of headlamps. The luminous flux is generally defined as the quantity that corresponds to the light power emitted by a source and is expressed in lumens ( lm). The vehicles involved may be of any type and the invention relates in particular to those in which the driving means operate at least partly with electrical energy.

In the latter case, vehicle autonomy, that is to say the distance that the vehicle can travel without requiring to be resupplied with energy, is a particularly important parameter even though recent improvements in batteries have extended vehicle autonomy. A legitimate fear of a driver is that of breaking down or not being able to reach his intended geographical destination.

Current techniques essentially offer the driver the option of obtaining numerical information about the vehicle autonomy. The user is then simply left free to react to these data.

What is needed, therefore, is a system and method that provides improved control.

SUMMARY OF THE INVENTION

The present invention aims to remedy these limitations and to offer new options of controlling the operation of the vehicle according to the autonomy.

For this purpose, the invention provides a system and method for controlling at least one component of a motor vehicle provided with energy storage means. The method comprises the following steps:
  determination of an energy reserve value of the vehicle;
  evaluation of at least one critical energy autonomy threshold; and
  comparison of the energy reserve value with at least one critical autonomy threshold so as to deduce therefrom a setpoint signal for controlling the component.

The operation of the component in question, such as a headlamp, may thus be adapted according to objectives of distance to be travelled and of energy consumption needed to reach a target geographical point.

By virtue of this provision, in all situations that allow it, the consumption of the vehicle is adapted with the objective that the vehicle autonomy in terms of energy is sufficient to reach a destination corresponding to a critical autonomy threshold.

The method may comprise the step of using a setpoint signal to control the component.

According to one embodiment, the determination of an energy reserve value of the vehicle comprises measuring the energy stored in at least one electrical battery. The invention is thus very suitable for electrically powered vehicles. The determination of an energy reserve value of the vehicle may also, or alternatively to the above case, comprise measuring a volume of fuel and converting the volume of fuel into an amount of energy. The invention may thus be proposed for internal combustion engine vehicles or hybrid vehicles.

The method according to the invention may furthermore have, optionally, at least any one of the following features:
  the comparison step comprises making a comparison between the energy reserve value and a critical autonomy threshold, the step being configured so as to generate as output a setpoint signal when the energy reserve value is below the critical autonomy threshold. The comparison, by comparing the level of the two information inputs, is a calculation easy to perform in an onboard system;
  the evaluation step comprises evaluating several critical energy autonomy thresholds and the comparison step comprises making several comparisons, each between the energy reserve value and a different critical autonomy threshold and each generating as output a setpoint signal when the energy reserve value is below the critical autonomy threshold. This allows the method to be refined with several setpoints, each corresponding to an autonomy threshold reflecting a particular situation for the vehicle, such as the distance separating it from a service station, from a destination input into a navigation system, a drive at night in which a breakdown would be more troublesome than in the daytime, etc.);
  each comparison has a priority level so that, when several control signals are generated, the setpoint signal generated by the higher priority level comparison is used to control the component of the vehicle. As regards the few examples, given in the preceding paragraph, of situations reflected by the thresholds, it will be understood that it is advantageous to hierarchize the critical thresholds so as to deliver the most appropriate control setpoint signal;
  the evaluation step comprises, for evaluating a threshold:
    the definition of a geographical point to be reached; and
    the provision of the amount of energy necessary to reach the geographical point. This evaluation step advantageously uses data output by a navigation system with geolocation and historical operating data of the vehicle;
  the setpoint signal is used to control a headlamp. Adjusting the control for such headlamps, which are components that consume a relatively large amount of electricity in a conventional vehicle, makes it possible for the autonomy to be substantially modified. The invention draws advantage from the fact that the energy consumption of a headlamp may, in many cases, be modified over quite a large power range, for example a power range going from 12 W, for a low beam when the vehicle is being driven in a town, to 25 W, for a low beam when the vehicle is being driven in the country. According to a more advantageous embodiment, this power range extends from 5 W, for a low beam when the vehicle is being driven in urban traffic, to 50 W, for a low beam when the vehicle is being driven in the open country;
  the definition of a desired luminous flux according to the setpoint power level, defined by the setpoint signal is established and, advantageously, the headlamp is controlled so as to produce the desired luminous flux if the desired luminous flux is above a predefined minimum threshold and the headlamp is operated so as not to modify its control so as not to modify the luminous flux if the desired luminous flux is below the predefined minimum flux. Safety rules in terms of illumination and indication minima are therefore maintained; and the determination, evaluation and comparison steps are carried out with a predefined frequency. Thus, the control of the component is periodically readjusted according to the change in the actual situation of the vehicle.

According to another option, the setpoint signal is used to control a speed regulator. Speed regulation is in fact another component that has a strong influence on the autonomy.

In another case, the setpoint signal is used to control a warning indicator. This may be a visual information display indicating that a critical threshold has been violated.

Several components of the vehicle may be controlled by virtue of the invention, by the same setpoint signals or by the generation of setpoint signals delivered in parallel, each having a form adapted to the control of a component.

The invention also relates to a device for controlling at least one component of a motor vehicle provided with energy storage means comprising processing means configured to implement the steps of the method according to the invention.

The invention furthermore relates to a vehicle comprising such a control device.

According to another subject of the invention, a computer program product is provided that comprises one or more sequences of instructions that are executable by a data processing unit, the execution of the sequences of instructions enabling the method to be implemented according to any one of the features of the above method.

Other features, aims and advantages of the present invention will become apparent on reading the detailed description that follows, and in conjunction with the appended drawings, given by way of nonlimiting examples in which:

BRIEF DESCRIPTION OF THE ACCOMPANYING DRAWINGS

FIG. 3 shows, for a white LED, the variation of the current in the LED as a function of the DC voltage at a given temperature, namely 25° C. in the example;

FIG. 4 shows, for a white LED, the variation of the DC voltage as a function of the temperature for a given current, namely 350 mA in the example;

FIG. 5 shows the variation of the luminous flux, for a white LED, as a function of the LED current at a given temperature, namely 25° C. in the example; and FIG. 6 shows the variation, for a white LED, of the luminous flux as a function of the temperature for a given current, namely 350 mA in the example.

DETAILED DESCRIPTION OF THE PREFERRED EMBODIMENTS

Figure 1:
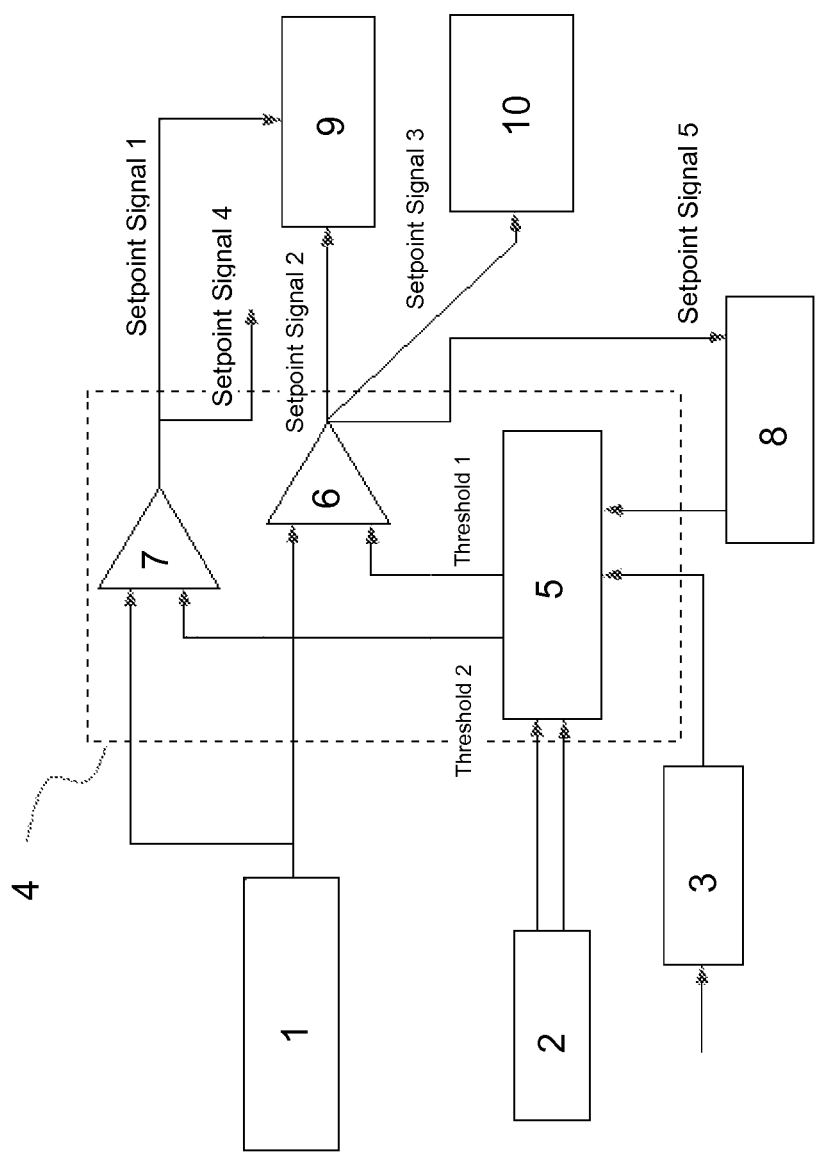
FIG. 1 illustrates various interacting constituents for implementing the invention.

The method of the invention may be implemented by a control device. An example of a device is illustrated in FIG. 1. The parts making up the device may be dedicated to the invention or may be elements shared with other functionalities of the vehicle. Thus, various processing operations may be carried out by a microcontroller pre-existing in the vehicle. Another example is that the measurement of the energy reserve values may employ measurement means already present in the vehicle, such as a fuel gauge or a battery charge level meter.

The various constituents shown in FIG. 1 are explained in detail below.

The entity referenced 4 in FIG. 1 corresponds to processing means capable of carrying out certain phases of the method of the invention. The processing means 4 are linked with various constituents. Moreover, the processing means 4 receive information from a number of sources. One of them corresponds to the block 1 relating to measurement means. According to one option, these measurement means are means for measuring the electrical energy stored in at least one battery of the vehicle. This case is suitable for entirely electric vehicles and to hybrid vehicles. The measurement means 1 may also comprise a fuel gauge and means for converting the volume of fuel into an amount of energy. Thus, it is possible for example to add the energy reserves, corresponding to batteries and to a volume of fuel, by making a conversion for approximating the amount of fuel to a corresponding amount of electrical energy. Given below is an example of a conversion formula for converting such a volume of fuel to an amount of energy. The chemical potential energy of one liter of gasoline is about $3.4 \times 10^7$ J. Given the relative efficiencies of an internal combustion engine and an electric motor, around 35% and 80% respectively, it is possible to convert the potential energy of one liter of gasoline used by a vehicle internal combustion engine into $1.5 \times 10^7$ J delivered by a battery to a motor vehicle electric motor. The measurement means 1 serve to deliver, as output, an energy reserve value of the vehicle.

This energy reserve value may be injected as input into the processing means 4.

According to the invention, at least one critical energy autonomy threshold is also evaluated. Several thresholds may be calculated, as will be described later. Each critical autonomy threshold corresponds to a minimum amount of energy needed to reach a given geographical objective, essentially a geographical point. For this purpose, the processing means 4 comprise evaluation means 5 for evaluating this or these critical autonomy thresholds. As input, in the example proposed in FIG. 1, the evaluation means 5 receive information provided by a navigation system of the GPS (Global Positioning System) type. Firstly, the navigation system may provide static information relating to the itinerary followed by the vehicle. This may be of the type relating to the road, to the contour levels, to the quality of the road, etc. Secondly, the navigation system 2 may provide information relating to the dynamic traffic situation, such as the presence of traffic jams. Finally, the global positioning navigation system serves to locate the vehicle relative to various geographical points. These points may especially be:

a destination;
the location of a service station; and
the situation of the nearest town.

The definition of such a geographical point to be reached will allow the amount of energy needed to reach the geographical point to be determined. These steps, which the evaluation means may perform, also use information about the vehicle's consumption. Future consumption is estimated in particular by means of the historical data present in the storage means 3.

This historic data may comprise past speed, average consumption and instantaneous consumption information and is used for determining the probable future energy consumption of the vehicle.

This consumption is approximated on the basis of the distance separating the actual location of the vehicle from the geographical point to be reached and on the type of itinerary, so as to evaluate the critical autonomy threshold corresponding to the geographical point in question.

If several thresholds are calculated, similar evaluation methods may be used for each of these thresholds.

Once this evaluation has been performed, it is possible to compare the determined threshold data with the energy reserve data obtained from the measurement means 1.

To do this, processing means 4 further includes means for comparing these values, the means being shown in FIG. 1 in the form of comparators 6, 7. Advantageously, as many comparators are formed as critical autonomy thresholds to be processed.

The comparators 6, 7 each serve to process a threshold, here the threshold 1 and the threshold 2 respectively. The threshold data is thus injected into one of the inputs of the comparator 6 or 7 and the energy reserve value of the vehicle is injected into the other input.

Other solutions may be implemented, especially by calculating whether the energy reserve value is below a certain proportion of the critical autonomy threshold.

In FIG. 1, it is readily understood that when the energy reserve value becomes below the threshold 1, the comparator 6 is triggered so as to generate a setpoint signal 2. Likewise, when the energy reserve value becomes below the threshold 2, the comparator 7 is triggered so as to generate a setpoint signal 1.

Several setpoint signals may be generated by means of the same comparator, especially for controlling various components of the vehicle. Thus, the comparator 6 in FIG. 1 delivers a setpoint signal 2 and a setpoint signal 3, each to different components identified as 9, 10, and a setpoint signal 5 to the driver, who is represented by the block 8. Likewise, the comparator 7 here is designed to deliver a setpoint signal 1 to a component 9 and a setpoint signal 4.

In the case of a number of thresholds for the same component, it is preferred to assign a priority level to each of the comparators 6, 7. The priority level is predefined and is advantageously a function of the level of criticality that the critical autonomy threshold corresponding to the comparator represents. As an example, a higher priority level may be assigned to a critical autonomy threshold corresponding to the distance to a nearby service station relative to a critical autonomy threshold corresponding to the distance to a destination input into the navigator.

By dint of these priority levels, it is possible to determine, as outputs of the comparators 6, 7, which setpoint signal is to be used for controlling a component.

The components in question may be of any type and are mainly of the type for varying the energy consumption so as to modify the vehicle autonomy according to the requirements.

The block 9 in FIG. 1 represents a device for controlling a headlamp consisting of a source comprising a plurality of light-emitting diodes (LEDs) conventionally comprising a microcontroller that calculates a control function for controlling an oscillator 11 which itself controls a chopper as supply input for the LEDs.

The generation of a headlamp control signal will be the subject of a detailed example with reference to FIG. 2, later on in the description.

Another type of component controlled according to the invention may be a speed regulator 10, currently used to regulate the speed of a vehicle according to a speed setpoint value. The speed value is generally set by the driver. According to the invention, the setpoint speed may be varied, especially so as to reduce it in order to limit the consumption by the driving means of the vehicle.

The control signal injected into the speed regulator 10 may be a setpoint signal indicating a reduction in the speed by a certain proportion or to a certain level.

It should be noted that another type of component that the invention may control is means for indicating a warning to the driver. Thus, an indicator in the form of a display may be controlled by a setpoint signal 5 for the driver 8 so as to inform him of a warning level. Several warning levels may be generated, each by a setpoint signal triggered by a different critical autonomy threshold.

FIG. 1 shows that the driver 8 himself may, depending on the warning generator, adapt the settings of the vehicle or the road behavior thereof.

Figure 2:
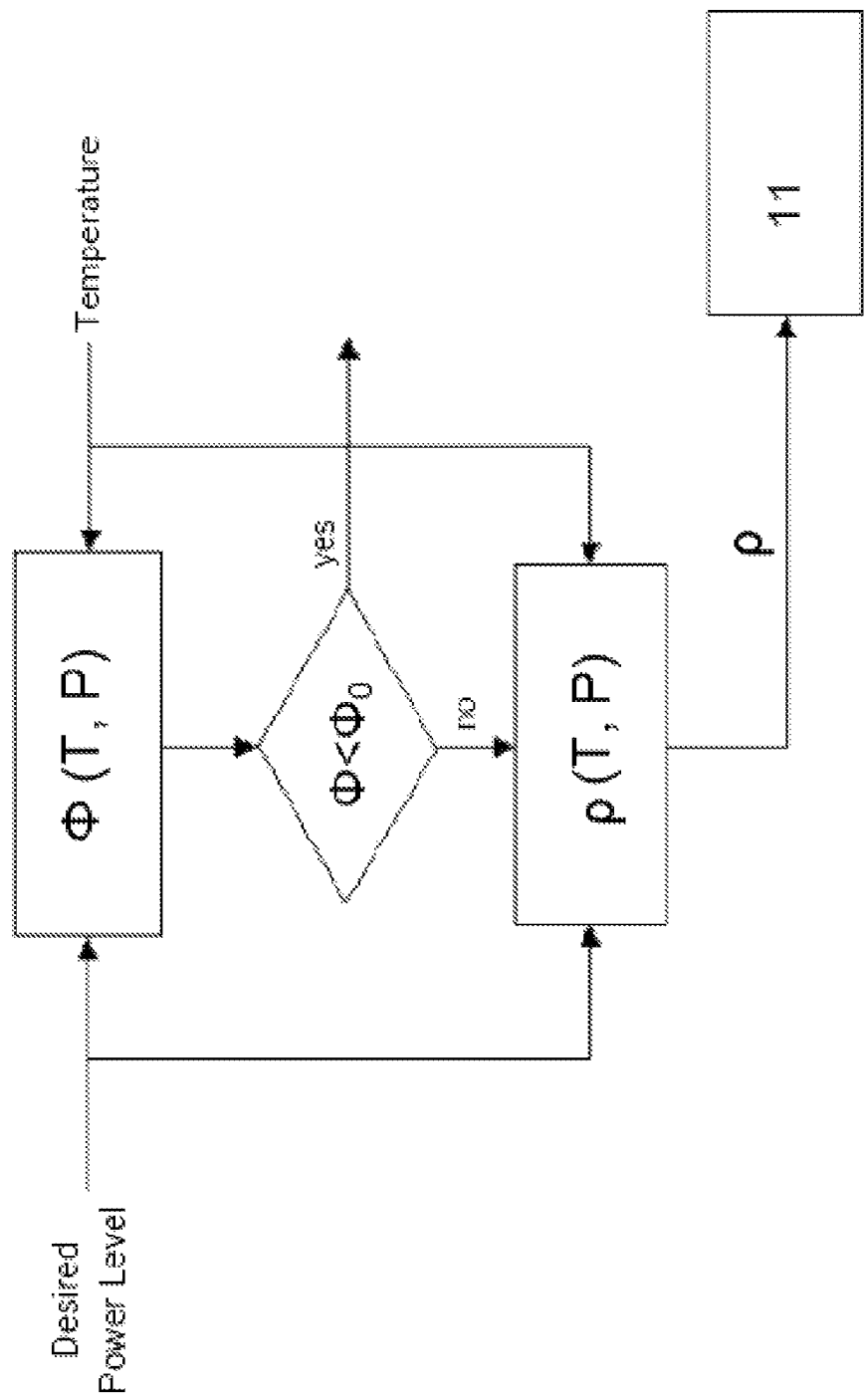
FIG. 2 shows an example of the control of a component consisting of a vehicle headlamp.

FIG. 2 shows more particularly the generation of an LED headlamp control signal on the basis of a setpoint signal.

Thus, a desired power level is used and defined by a setpoint signal (the setpoint signals 1 and 2).

A luminous flux corresponding to the desired power level as a function of the temperature of the LED panel is calculated. The function $\phi(T,P)$ indicated in FIG. 2 helps to determine a desired luminous flux. As an example, this determination may be carried out using charts and/or by means of an algorithm.

In the example that follows, the following notations are used:

P: power consumed by the LED;

$V_f$: DC voltage;

$I_f$: direct current in the LED;

$T_a$: ambient temperature;

$T_{a0}$: ambient temperature used by the manufacturer to establish the $V_f(I_f)$ and $V_f(T_a)$ curves given in FIG. 3 for example; and $I_{f0}$: current chosen by the manufacturer to establish the $V_f(T_a)$ curve given in FIG. 4 for example.

In the case of the figures provided, $I_{f0}$=350 mA and $T_{a0}$=25° C.

$$P = V_f(I_f, T_a) \cdot I_f \approx V_f(I_f, T_{a0}) \cdot \frac{V_f(T_a, I_{f0})}{V_f(T_{a0}, I_{f0})} \cdot I_f = p(I_f, T_a), \quad (1)$$

$$\text{where } I_f = p^{-1}_{(T_a)}(P)$$

and the terms $V_f(I_f, T_{a0})$ and $$\frac{V_1(T_a, I_{f0})}{V_f(T_{a0}, I_{f0})}$$

are known functions provided by the LED manufacturer. For example, FIG. 3 gives the current in the LED (DC current) $I_f$ as a function of the direct temperature $V_f$ with $T_a=T_{a0}=25°$ C. (the value used by the manufacturer to establish the technical specifications thereof).

FIG. 4 gives the value of $V_f$ at $I_f=350$ mA as a function of the ambient temperature $T_a$.

This example is given for a commercial white LED and of course is nonlimiting.

Furthermore, $$\Phi = \Phi(I_f, T_a) \approx \Phi(I_f, T_{a0}) \frac{\Phi(I_{f0}, T_a)}{\Phi(I_{f0}, T_{a0})} \qquad (2)$$

where the two terms of the product are also known and provided by the light source manufacturer.

FIGS. 5 and 6 give examples of data supplied by manufacturers in this regard. FIG. 5 is at $T_a = T_{a0} = 25°$ C. and shows the relative luminous flux as a function of the current $I_f$.

The relative luminous flux is also illustrated as a function of the ambient temperature $T_a$ in FIG. 6 at a fixed $I_f$ of 350 mA.

The value of $\phi$ corresponding to the desired flux is obtained from formulae (1) and (2).

The desired flux is then compared with a minimum value $\phi_0$ corresponding to a minimum threshold necessary for safety.

If the desired luminous flux is below the minimum flux, the control for the headlamp stays the same. Otherwise, the desired luminous flux is used to operate the headlamp In the case shown, this is in the form of a duty cycle $\rho(P,T)$ of an oscillator 11 controlling a chopper for supplying the LEDs.

It should be noted that this example is not limiting and, in particular, that there may be several choppers connected to different groups of LEDs. Moreover, the duty cycle control may be replaced or complemented in systems comprising several light sources in the form of LEDs. Thus, modification of the duty cycle may be replaced by modification of binary controls defining the switching-on or switching-off of certain LEDs or certain groups of LEDs.

The method of the invention is advantageously performed in real time, at a predefined frequency, so that the control of the components is frequently re-evaluated, making it possible to take account of the changes in situation external to the vehicle that it would be difficult to anticipate.

The invention is not limited to the embodiments described, rather it encompasses any embodiment consistent with the spirit thereof.

While the system, apparatus and method herein described constitute preferred embodiments of this invention, it is to be understood that the invention is not limited to this precise system, apparatus and method, and that changes may be made therein without departing from the scope of the invention which is defined in the appended claims.

What is claimed is:

1. A method for controlling a luminous flux of a headlamp of a motor vehicle provided with energy storage means, said method comprising the following steps:
   determining an energy reserve value of the vehicle;
   evaluating at least one critical energy autonomy threshold; and
   comparing said energy reserve value with said at least one critical autonomy threshold so as to deduce therefrom a setpoint signal for controlling said headlamp;
   said setpoint signal being a setpoint power level for controlling the luminous flux from said headlamp; and
   using said setpoint signal to adjust an energy consumption of said headlamp to control the luminous flux of said headlamp;
   wherein said setpoint signal is used to control said headlamp and said setpoint signal is generated as a result of said comparing step.

2. The method according to claim 1, in which the determination of an energy reserve value of the vehicle comprises measuring the energy stored in at least one electrical battery.

3. The method according to claim 1, in which the determination of an energy reserve value of the vehicle comprises measuring a volume of fuel and converting the volume of fuel into an amount of energy.

4. The method according to claim 1, in which the comparison step comprises making a comparison between the energy reserve value and a critical autonomy threshold, said step being configured so as to generate as output a setpoint signal when the energy reserve value is below the critical autonomy threshold.

5. The method according to claim 4, in which the evaluation step comprises evaluating several critical energy autonomy thresholds and in which the comparison step comprises making several comparisons, each between the energy reserve value and a different critical autonomy threshold and each generating as output a setpoint signal when the energy reserve value is below the critical autonomy threshold.

6. The method according to claim 5, in which each comparison has a priority level so that, when several control signals are generated, the setpoint signal generated by the higher priority level comparison is delivered to the at least one component of the vehicle.

7. The method according to claim 1, in which the evaluation step comprises, for evaluating a threshold:
   the definition of a geographical point to be reached; and
   the provision of the amount of energy necessary to reach the geographical point.

8. The method according to claim 7, in which the evaluation step uses data output by a navigation system with geolocation and historical operating data of the vehicle.

9. The method according to claim 1, in which the setpoint signal is used to control a headlamp.

10. The method according to claim 9, comprising the definition of a desired luminous flux as a function of a setpoint power level defined by the setpoint signal.

11. The method according to claim 10, which comprises controlling the headlamp so as to produce the desired luminous flux if the desired luminous flux is above a predefined minimum flux and not modifying the control for the headlamp if the desired luminous flux is below the predefined minimum flux.

12. The method according to claim 1, in which the determination, evaluation and comparison steps are carried out over a predefined period.

13. The method according to claim 1, in which the setpoint signal is used for controlling a speed regulator.

14. A procedure according to claim 1, in which the setpoint signal is used to control a warning indicator.

15. A device for controlling a luminous flux of a headlamp of a motor vehicle provided with energy storage means, said device comprising:
   measurement means for determining an energy reserve value of the vehicle;
   evaluation means for evaluating at least one critical energy autonomy threshold and comparing said energy reserve value with said at least one critical autonomy threshold so as to deduce therefrom a setpoint signal for controlling said headlamp;
   said setpoint signal being a setpoint power level for controlling the luminous flux from said headlamp; and
   processing means using said setpoint signal to adjust an energy consumption of said headlamp to control the luminous flux of said headlamp;
   wherein said setpoint power level is used to control the luminous flux from said headlamp and said setpoint power level is generated as a result of said comparison by said evaluation means.

16. The device according to claim 15, wherein the motor vehicle has at least one electrical battery, said measurement means measures energy stored in said at least one electrical battery.

17. The device according to claim 15, wherein said measurement means measures a volume of fuel and converts the volume of fuel into an amount of energy.

18. The device according to claim 15, wherein said evaluation means makes a comparison between the energy reserve value and a critical autonomy threshold and generates as output said setpoint signal when the energy reserve value is below the critical autonomy threshold.

19. The device according to claim 18, wherein said evaluation means evaluates several critical energy autonomy thresholds and makes several comparisons, each between the energy reserve value and a different critical autonomy threshold and each generating as output said setpoint signal when the energy reserve value is below the critical autonomy threshold.

20. The device according to claim 19, wherein each comparison made by said evaluation means has a priority level so that, when several control signals are generated, said setpoint signal generated by the higher priority level comparison is delivered to the at least one component of the vehicle.

21. The device according to claim 15, wherein said evaluation means comprises, for evaluating a threshold:
   a definition of a geographical point to be reached; and
   a provision of the amount of energy necessary to reach the geographical point.

22. The device according to claim 21, wherein said evaluation means uses data output by a navigation system with geolocation and historical operating data of the vehicle.

23. The device according to claim 15, wherein said processing means comprises a definition of a desired luminous flux as a function of a setpoint power level defined by said setpoint signal.

24. The device according to claim 23, wherein said processing means controls the headlamp so as to produce the desired luminous flux if the desired luminous flux is above a predefined minimum flux and not modifying the control for the headlamp if the desired luminous flux is below the predefined minimum flux.

25. The device according to claim 15, wherein evaluations and comparisons are each carried by said evaluation means out over a predefined period.

\* \* \* \* \*